United States Patent [19]

Black et al.

[11] Patent Number: 6,012,042

[45] Date of Patent: Jan. 4, 2000

[54] SECURITY ANALYSIS SYSTEM

[76] Inventors: T. Keith Black, 5208 Glen Vista, Garland, Tex. 75044; John R. Jennings, 1806 Dover, Rowlett; Andrew Laska, 803 Fontana, Richardson, both of Tex. 75088

[21] Appl. No.: 08/698,816

[22] Filed: Aug. 16, 1996

Related U.S. Application Data

[60] Provisional application No. 60/002,434, Aug. 16, 1995.

[51] Int. Cl.[7] .............................. G06F 15/00; G06F 12/00; G06F 17/60; G06G 7/52

[52] U.S. Cl. .............................. 705/36; 705/35; 395/726; 707/533

[58] Field of Search ........................ 705/36, 35; 364/600, 364/246.8, 282.2, 281.3; 395/726; 707/533

[56] References Cited

U.S. PATENT DOCUMENTS

| | | | |
|---|---|---|---|
| 3,270,190 | 8/1966 | Lambert | 705/36 |
| 3,749,892 | 7/1973 | Stenning | 705/36 |
| 5,161,103 | 11/1992 | Kosaka et al. | 705/36 |
| 5,414,838 | 5/1995 | Kolton et al. | 707/104 |
| 5,692,233 | 11/1997 | Garman | 705/36 |

Primary Examiner—Allen R. MacDonald
Assistant Examiner—Pedro R. Kanof
Attorney, Agent, or Firm—Senkens & Gilchrist

[57] ABSTRACT

An improved securities analysis system includes a data conversion device for converting both technical and fundamental data about a security into a unified format for analysis by an analysis process engine. The analysis process engine processes the disparate data in accordance with a set of rules and the results are forwarded to a display for viewing or used in further analysis.

38 Claims, 5 Drawing Sheets

SECURITY ANALYSIS SYSTEM

PRIORITY STATEMENT UNDER 35 U.S.C. § 119 & 37 C.F.R. § 1.78

This nonprovisional application claims priority based upon the following prior U.S. Provisional Patent Application:

| SERIAL NO. | FILING DATE | TITLE | INVENTOR |
|---|---|---|---|
| 60/002,434 | 08/16/95 | Security-Buying Decision-Making Software Implementing Both Fundamental and Technical Analysis | Jennings et al. |

BACKGROUND OF THE INVENTION

1. Field of the Invention

The present invention relates generally to a system for securities analysis, particularly, to a system for combining disparate time-relevant securities analyses, and, more particularly, to a system for variably combining a technical price and volume analysis with a fundamental analysis for a given security, and displaying the time-relevant results of the combination.

2. Background and Objects of the Invention

The analysis and prediction of trends in the stock market is clearly a matter of intense interest. With the increasing power of computers, stock analysis and securities portfolio management have become more sophisticated, and with the rise of the PC, more mainstream. Individuals now track their investments and monitor the stock market automatically in an attempt to spot a hot issue. With the increasing availability of historical information pertaining to a given stock, family of stocks or other groups of stocks, patterns can be deduced and purchases made in anticipation of a predicted trend.

Currently, there are two primary tools or methodologies in security analysis: technical and fundamental. Each has its advantages and disadvantages, discussed below, in analyzing stocks, futures (commodities), indices, mutual funds, bonds, options and other securities.

In technical analysis, security movements are predicted by examining past price movements, e.g., volume (number of shares sold) of a particular issue, issues or market index. Technical data includes the price and volume figures for stocks, Open Interest for commodities (futures) contracts, and related information. More particularly, technical data on price includes the open (first sale price of the trading day), high (highest trading price of the day), low (lowest sale price of the trading day), and/or the close (the last trading price of the day). Further price information could also include open, high, low and close prices on an hourly, a weekly, monthly and yearly basis. Additionally, technical data such as the daily price at which the most shares were sold for a particular issue and similar data are also useful. Similar volume information is also available. "Technical trading systems" perform hypothetical buying and selling decisions based on the price and volume history as well as various rules. Because of the frequency or periodicity of technical data, buying and selling decisions may be made on a regular basis.

Fundamental analysis, however, used primarily for stocks, is based on much more loosely-defined data such as found in company disclosures. In other words, fundamental data may be defined as any value-oriented corporate data used to help qualify and quantify an investor's expectations for a company's future. The use of company reports, SEC reporting requirements and publications, security analysts' projections and a host of other sources of information are just part of the fundamental equation.

Fundamental data may include, for example, earnings per share (EPS), i.e., the after expense earnings of a company over a particular time period divided by the number of outstanding shares of that issue; a "quick ratio" for a general measure of how a company can cover its debts, i.e., a measure of liquidity calculated by taking cash, short-term investments and accounts receivable and dividing their sum by the total current total liabilities, where short-term investments includes current inventory; dividends, i.e., an amount of money or "cut" paid to shareholders on a periodic basis; net worth, i.e., the total amount of monetary worth of a company if all assets were immediately liquidated, which includes current inventory, cash on hand, buildings owned, intellectual property and other assets; and capital gains, price-to-earnings (PE) ratio, profit/loss statistics, etc. Whereas technical data is usually stored on a daily (or other regular period) basis, fundamental data is less frequent and more irregular, such as every quarter. In addition to the above differences, "Fundamental Systems" using fundamental data are more intuitive decision systems than those for technical systems using objective and ordered historical data. Because fundamental data is more subjective in nature, analysis is typically reserved for stocks. For example, one may examine the top X number of stocks based on their price performance and find that a presumably large percentage of the associated companies had several consecutive quarters in which the reported Earnings Per Share (EPS) disclosures were noticeably higher as compared to the same quarter last year and that this chain of increased EPS statements preceded a sharp rise in stock price for the following, i.e., current, year. Even though statistical analysis of fundamental data yields strong correlations, i.e., a quite reliable indicator, the data is infrequent and generally comes in after long intervals, leaving the investor at risk during the interims.

It is, therefore, apparent that a combination of the technical and fundamental methodologies would be an advantageous advancement in the art. Applicants are, however, not aware of any system, that combines or merges both technical and fundamental data simultaneously. Applicants discovered that serious non-trivial problems stand in the way of such a combination. For example, the data and data structures used in both methodologies differ substantially and are quite cumbersome and computationally demanding to meaningfully conjoin. Since there are more than 9,000 different common stock issues trading on the three major American stock exchanges (NASDAQ, New York Stock Exchange, and the American Stock Exchange), a typical set of technical and fundamental data calculations for all or a subset of common stocks would easily entail hundreds of thousands of calculations daily. More fine analysis on an hourly or other intra-daily basis would increase the calculations enormously taxing even powerful computer systems.

Accordingly, it is an object of the present invention to provide an improved securities analysis system to facilitate the analysis of securities on a computer system.

More specifically, it is an object of the present invention to provide an improved securities analysis system for simultaneously and meaningfully combining historical securities data under both a technical and a fundamental methodology into a coherent format.

SUMMARY OF THE INVENTION

The improved securities analysis system in accordance with the present invention includes a data conversion device for converting both technical and fundamental data about a security into a unified format for analysis by an analysis process engine. The analysis process engine processes the disparate data in accordance with a set of rules and the results are forwarded to a display for viewing or used in further analysis.

A more complete appreciation of the present invention and the scope thereof can be obtained from the accompanying drawings which are briefly summarized below in the following detailed description of the presently-preferred embodiments of the invention and the appended claims.

Figure 1:
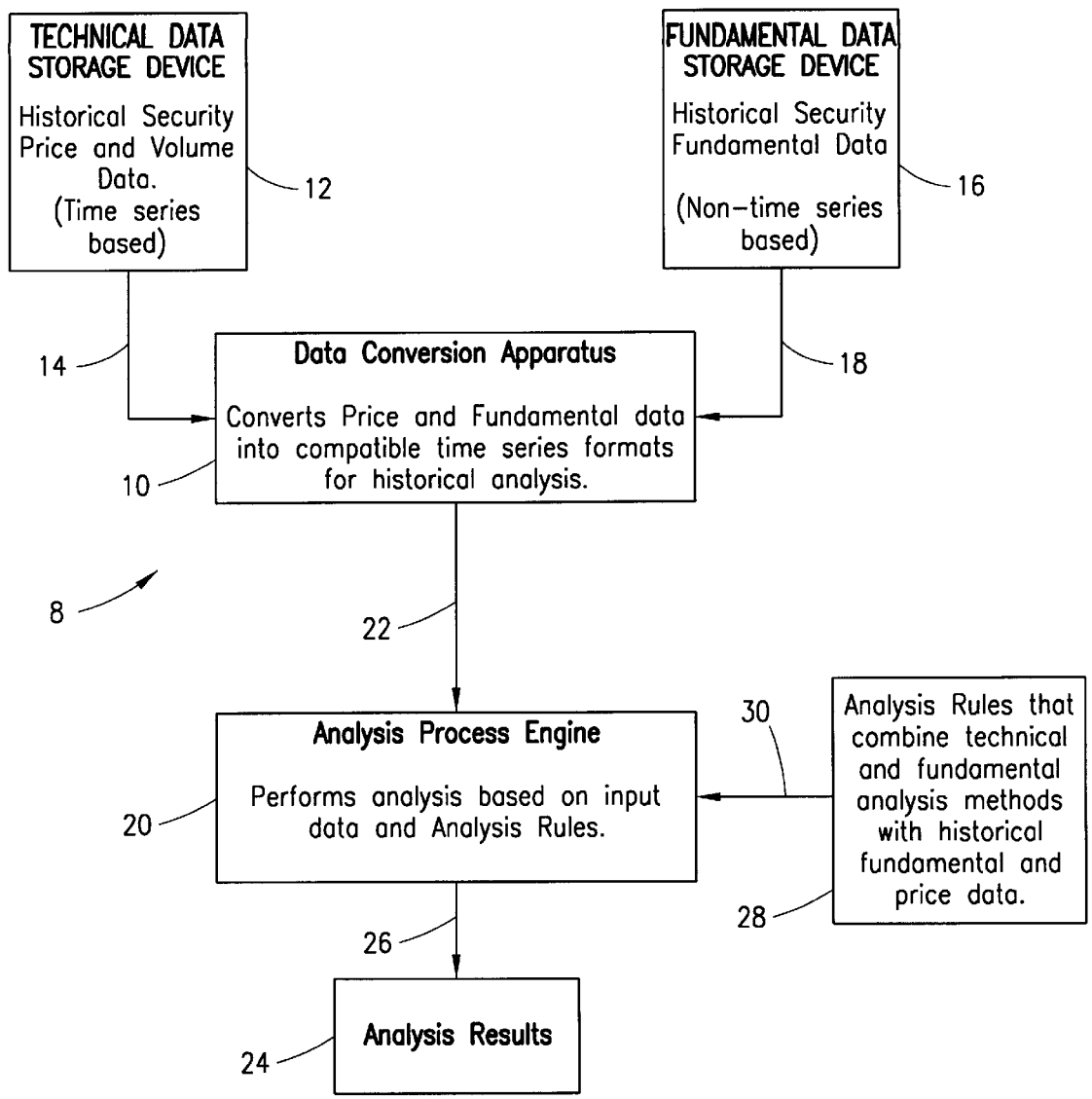
FIG. 1 is a block diagram of an improved security analysis system according to the present invention.

DETAILED DESCRIPTION OF THE PREFERRED EXEMPLARY EMBODIMENTS OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As discussed, the present invention is directed to an improved system for securities analysis. More particularly, the computer system of the presently claimed invention manipulates historical data on a security, a plurality of securities, families of securities, etc. in an effort to gain insight as to the future performance of those stocks or securities. Whereas some portions of the historical data lend themselves well to time-based analysis, e.g., a series of daily prices and trade volumes, and a chart may be created to illustrate these sequential events, other portions of the historical data are not so regularly arranged i.e., are not so time-relevant. For example, some corporate historical information about a security or whole families of securities may be found in that corporation's quarterly and/or annual reports, published quarterly, annually or more infrequently.

The combination of these and other disparate, non-uniform historical data into a unified format is a goal of the present invention. Heretofore, time-based "technical" historical data has been analyzed using technical indicating software tools to demonstrate stock movement trends based on the sequential historical data. Accordingly, the peaks, valleys and plateaus of a given security's fluctuating value could be charted easily, trends spotted and predictions made therefrom.

However, other relevant information was available that could impact the analysis and predictions made on the technical data, i.e., the corporate or fundamental historical data. This information is typically reviewed by the analyst or user as a prelude to technical analysis on a computer, i.e., the analyst would generally limit his analysis to those securities only. Although fundamental data is by its nature irregular and subjective, such data can nonetheless be quite relevant to an analyst studying a given security or stock or families of stocks. Since the formats of the two types of historical data differ substantially, however, combining the two types of data into a uniform format has been quite difficult and non-trivial. Applicants are aware of only cumbersome manual ways to examine both types of information simultaneously. With the combination of these disparate data in different formats into a unified format, more information is conveniently and immediately available for analysis, and improved accuracy in predictions is possible as a result therefrom.

Shown in FIG. 1 is a block diagram of an embodiment of a security analysis system 8 according to the present invention. In the embodiment depicted in FIG. 1, a data conversion apparatus 10 is connected to a technical data storage device 12 via line 14 and a fundamental data storage device 16 via line 18. The technical data storage device 12 includes therein a plurality of price and volume data for at least one security. By its nature the technical data stored in device 12 is time series based, i.e., sequential. For example, the aforedescribed open, high, low, close and other price and volume data may be conventionally stored in arrays of sequential records in a database within storage device 12.

The fundamental data stored within device 16, however, is not necessarily so neatly configured or organized, and the individual records do not normally have the periodicity of the technical data. In any event, arrays of records of the non-sequential reports may be stored in a database within storage device 16 and accessed accordingly, as will be described hereinafter. Consequently, the combination of the irregularly-spaced, non-periodical fundamental data with the more regularly-spaced and periodical technical data offered numerous challenges to overcome. These challenges and the solutions thereof are set forth herein.

With reference again to FIG. 1, the two types of historical data forwarded to the data conversion apparatus 10 from storage devices 12 and 16 are compatibly combined and forwarded to an analysis process engine 20 via line 22. The data combination is then analyzed using a set of analytical tools or rules and the analysis results forwarded to another device 24 via line 26 for display, storage or further processing. The set of analytical rules may be found in a rules storage device 28 and retrieved by engine 20 via line 30. It should be understood that the functions of the data conversion apparatus 10 and the analysis process engine 20 may be performed by a central processing unit of a computer, and all or part of storage devices 12, 16 and 28 be resident within the hard drive or in the RAM of the computer.

To better understand the problems inherent in combining the disparate data, the structure of technical data stored in the technical data storage device 12 and forwarded to the data conversion apparatus 10 will first be described. For simplicity, only price data will be discussed. The storage and manipulation of volume and other types of technical data will follow therefrom. An example of an array or table of sequential, time-relevant, real world price data is shown below:

| Day   | M   | Tu  | W   | Th  | F   | Sat | Sun | M   | Tu  | W   | Th  | F   | Sat | Sun | M   | Tu  | ... |
|-------|-----|-----|-----|-----|-----|-----|-----|-----|-----|-----|-----|-----|-----|-----|-----|-----|-----|
| Avail | Val | Val | Val | Val | Val | Nil | Nil | Val | Val | Val | Val | Val | Nil | Nil | Val | Val | ... | where "Day" represents the day of the week and "Avail" represents those days of the week which are valid for containing data. "Val" means that a value is possible on that given day and "Nil" means that that day does not contain a value.

A problem with the daily periodicity data, as shown in the above table, is that there is no data for weekends, i.e., Saturdays and Sundays. Consequently, special data calculations and special procedures are required to allow a time series with five sequential days and two empty days. This problem is illustrated by the following table:

| Day       | M   | Tu  | W   | Th  | F   | Sat | Sun | M   | Tu  | W   | Th  | F   | Sat | Sun | M   | Tu  | ... |
|-----------|-----|-----|-----|-----|-----|-----|-----|-----|-----|-----|-----|-----|-----|-----|-----|-----|-----|
| Avail     | Val | Val | Val | Val | Val | Nil | Nil | Val | Val | Val | Val | Val | Nil | Nil | Val | Val | ... |
| Value     | 10  | 10  | 10  | 5   | 5   | Nil | Nil | 5   | 5   | 5   | 10  | 10  | Nil | NiL | 5   | 10  | ... |
| 3 day sum | n/a | n/a | 30  | 25  | 20  |     |     |     |     | 15  | 20  | 25  | 20  | 10  | 5   | 15  | ... |

The 3-day sum row adds the current and preceding two days. The Nil values on Saturday and Sunday, however, distort the calculation and must be removed to allow calculations, such as moving calculations, to operate correctly on this data. One solution is to remove or skip the weekend values, resulting in the following table:

| Day       | M   | Tu  | W   | Th  | F   | M   | Tu  | W   | Th  | F   | M   | Tu  | ... |
|-----------|-----|-----|-----|-----|-----|-----|-----|-----|-----|-----|-----|-----|-----|
| Value     | 10  | 10  | 10  | 5   | 5   | 5   | 5   | 5   | 10  | 10  | 5   | 10  | ... |
| 3 day sum | n/a | n/a | 30  | 25  | 20  | 15  | 15  | 15  | 20  | 25  | 25  | 25  | ... |

As shown, the 3-day sum now accurately depicts the sum over the relevant 3-day periods. Special data arithmetic must be used to effectively deal with years of daily data that contains two days missing out of every week. For example, if there are two thousand records and record 1 is on a Friday, then a quick way to determine the day/date of record 2000 is necessary.

Also, missing or empty non-weekend days may require insertion into any time series, e.g., missing values caused by holidays, non-trading days or various other situations. As with the missing weekends, special handling is necessary to ensure that series-based calculations, i.e., moving calculations and the like, operate correctly. Since moving averages and other calculations reference relative cells in the time series, it is imperative that all missing data elements be removed before any array calculation, else an invalid value such as zero will be inserted into all moving/relative calculations, skewing them. For example in the table

| Day       | M   | Tu  | W   | Th  | F   | M   | Tu  | W   | Th  | F   | M   | Tu  | ... |
|-----------|-----|-----|-----|-----|-----|-----|-----|-----|-----|-----|-----|-----|-----|
| Value     | 10  | 10  | 10  | 5   | 5   | Nil | 5   | 5   | 10  | 10  | 5   | 10  | ... |
| 3 day sum | n/a | n/a | 30  | 25  | 20  |     |     |     | 20  | 25  | 25  | 25  | ... | the missing data value (Nil) distorts the calculations. Accordingly, the shaded values are invalid. Removing the missing "empty" elements, before the calculations will permit the calculations to perform correctly. Thus, removing or "compressing" the empties in the above table results in the following table:

| Day       | M   | Tu  | W   | Th  | F   | Tu  | W   | Th  | F   | M   | Tu  | ... |
|-----------|-----|-----|-----|-----|-----|-----|-----|-----|-----|-----|-----|-----|
| Value     | 10  | 10  | 10  | 5   | 5   | 5   | 5   | 10  | 10  | 5   | 10  | ... |
| 3 day sum | n/a | n/a | 30  | 25  | 20  |     |     | 20  | 25  | 25  | 25  | ... |

After the calculations, the table can readily be uncompressed.

The above methodology for preserving the empty elements (except for purposes of calculations) is necessary for later combining the time series (technical) data for a security with other series data, and matching the two series element to element and date to date, despite the presence of empty elements in the series. This correspondence is clearly necessary because analysis calculations combining time-dependent values from two or more related series are made, and allowance must be made for the empty values interspersed therein.

Unlike the aforedescribed technical data, stored sequentially on a regular basis, fundamental data is stored on a less frequent basis. Although the majority of fundamental measures are reported on a quarterly basis, fundamental data is sometimes reported late, i.e., reported on a non-periodic basis. The system of the present invention takes account of occasional periodic, occasional but late periodic and occasional non-periodic data. For example, the following table illustrates typical values reported on a quarterly basis:

| Mo/Yr.. | 3/90 | 6/90 | 9/90 | 12/90 | 3/91 | 6/91 | 9/91 | 12/91 | 3/92 |
|---------|------|------|------|-------|------|------|------|-------|------|
| Value   | Val  | Val  | Val  | Val   | Val  | Val  | Val  | Val   | Val  |

Clearly, all values between the indicated quarterly dates, e.g., Mar. 2, 1990 and May 31, 1990, do not exist. Indeed, only daily values for the particular report dates, i.e., Mar. 1, 1990, Jun. 1, 1990, etc., are indicated, and the above table values and the aforedescribed daily technical data are clearly incompatible.

The present invention makes the two tables or data sets compatible by inserting the fundamental data into a format that fits the periodic format of the technical data, e.g., on a daily basis. This expansion of the fundamental data is illustrated below:

market days such as Saturday and Sunday (Mar. 3 and 4, 1990, for example) are removed.

Combining the expanded fundamental data table above with the technical data table discussed before results in the following:

| Date | 3/1/90 | 3/2/90 | 3/5/90 | 3/6/90 | . . . | 5/31/90 | 6/1/90 | 6/4/90 | 6/5/90 | 6/6/90 | . . . |
|---|---|---|---|---|---|---|---|---|---|---|---|
| Fundamental Value | Val #1 | Nil | Nil | Nil | . . . | Nil | Val #2 | Nil | Nil | Nil | . . . |
| report ? | Yes | | | | | | Yes | | | | . . . |

Thus all records for each calendar day are created and fundamental values inserted into the table for those days in which data was reported. The Nil values shown in the table above represent days between reporting dates. These Nil days have no value. This sparse data is used in certain cases when performing analysis but limits the analysis capability when combining this data with technical data that is reported on a regular basis. To allow the full benefit of combining technical and fundamental data, a method for providing fundamental values for days between quarterly reports is necessary. This invention introduces a function called the "prev" function. This function fleshes out the fundamental data, laid out on a quarterly basis, to fit the periodic format of the technical data, e.g., on a daily basis. This expansion or fleshing out of the fundamental data is illustrated below:

| Date | 3/1/90 | 3/2/90 | 3/5/90 | 3/6/90 | . . . | 5/31/90 | 6/1/90 | 6/4/90 | 6/5/90 | 6/6/90 |
|---|---|---|---|---|---|---|---|---|---|---|
| Fund Value daily value | Val #1 10 | Val #1 10 | Val #1 10 | Val #1 5 | . . . | Val #1 5 | Val #2 5 | Val #2 5 | Val #2 Nil | Val #2 10 |
| 3 day sum | n/a | n/a | 30 | 25 | . . . | 20* | 20* | 15 | ▒ | ▒ |
| report? | yes | | | | | | Yes | | | |

| Date | 3/1/90 | 3/2/90 | 3/5/90 | 3/6/90 | . . . | 5/31/90 | 6/1/90 | 6/4/90 | 6/5/90 | 6/6/90 | . . . |
|---|---|---|---|---|---|---|---|---|---|---|---|
| Fund Value | Val #1 | Val #1 | Val #1 | Val #1 | . . . | Val #1 | Val #2 | Val #2 | Val #2 | Val #2 | . . . |
| report ? | Yes | | | | | | Yes | | | | . . . |

The developer of any analysis system has the option to use the sparse data or to use the prev function to access fleshed out data. Thus, when using the prev function values are inserted into each of the calendar dates available in the technical data. For example, for all days from Mar. 1, 1990 to May 31, 1990, the fund value (Val #1) found in the corporation's quarterly report is inserted. Similarly, the fund's new value (Val #2) in the next report begins Jun. 1, 1990. An additional field, labeled report, is included as a diagrammatical reminder of the dates of the quarterly reports where the fundamental data was actually reported and is not part of the actual data. As discussed hereinbefore, non- As noted, the Nil value (in the record for Jun. 5, 1990) skews the calculations for the 3-day sum and is preferably removed (compressed) before the calculations are made. The star "*" indicates that the 3-day sum shown is based on values not shown in the table. The above table with the Nil removed results in:

| Date | 3/1/90 | 3/2/90 | 3/5/90 | 3/6/90 | . . . | 5/31/90 | 6/1/90 | 6/4/90 | 6/5/90 | 6/6/90 | . . . |
|---|---|---|---|---|---|---|---|---|---|---|---|
| Fund Value | Val #1 | Val #1 | Val #1 | Val #1 | . . . | Val #1 | | Val #2 | | Val #2 | Val #2 |
| daily value | 10 | 10 | 10 | 5 | . . . | 5 | | 5 | | 5 | 10 |

-continued

| Date | 3/1/90 | 3/2/90 | 3/5/90 | 3/6/90 | ... | 5/31/90 | 6/1/90 | 6/4/90 | 6/5/90 | 6/6/90 | ... |
|---|---|---|---|---|---|---|---|---|---|---|---|
| 3 day sum report? | N/A yes | N/A | 33 | 25 | ... | 20* 5 | | 20* Yes | | 15 | 20 |

Figure 2:
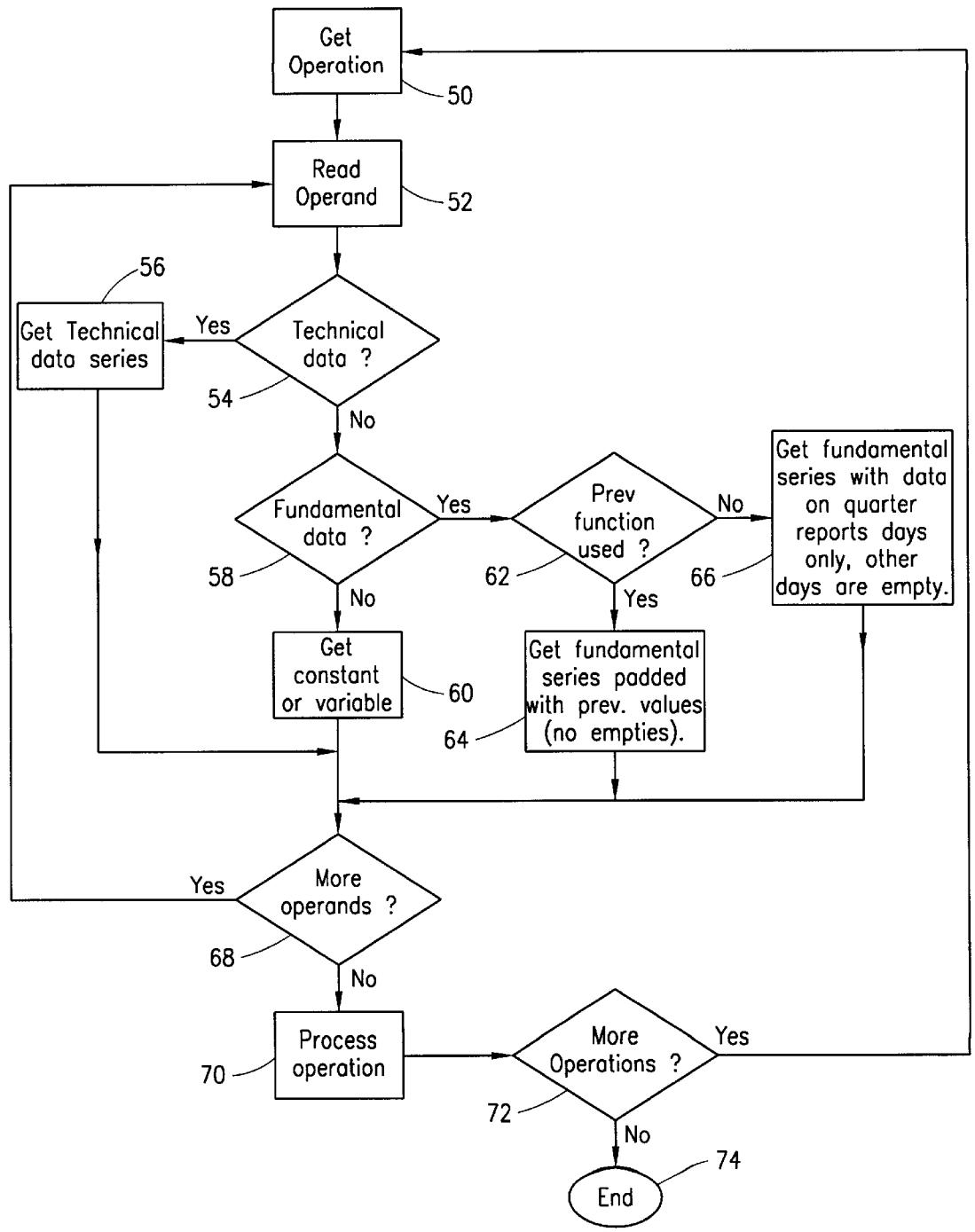
FIG. 2 is a schematic flow chart depicting the combination methodology of the present invention for processing security historical data, both technical and fundamental.

An algorithm for expanding the fundamental data into the format of the technical data performed within the data conversion apparatus 10 of the present invention is illustrated in the schematic flow chart of FIG. 2. The algorithm begins at get operation box 50 where an operation, such as a request for information on a given security, is received. An operand within the operation is then read (box 52) and forwarded to decision box 54. If technical data is requested, e.g., price or volume, then control is switched to box 56 and the requisite technical data obtained. If not, then control is switched to another decision box 58. If fundamental data is requested, e.g., an EPS value, then control is switched to box 62. If not, then control is switched to box 60 and a constant or variable associated with the particular operand is obtained.

As noted, if fundamental data is requested, then a determination must be made (box 62) whether a particular function, "prev" used in the present invention, has been called. The prev function, when called, reports the last reported fundamental value at any point in time. For example, if an EPS is requested for Jul. 5, 1996 and that day is not the particular day of the quarterly report, then no value is available. The prev function, however, looks backward in time within the fundamental data database to find the previous EPS, e.g., in the company's Jun. 1, 1996 quarterly report. Accordingly, the EPS value for Jul. 5, 1996, i.e., Jun. 1, 1996, is obtained.

Referring back to FIG. 2, if the prev function was used with the operand, then control is switched to box 64, and if not, box 66. If the prev function was not used with the operand (box 66), then a series of data records containing only valid elements on reporting dates will be returned, e.g., Mar. 1, 1990 and Jun. 1, 1990, each element between the reporting days will be empty. If the prev function was used (box 64), then the intra-report records are padded with fundamental data values to complete the time line between the widely separated report dates.

Control after boxes 56, 60, 64 and 66 is transferred to decision box 68 where a determination is made whether there are any further operands. If so, control is returned to box 52 and additional operands inputted. Otherwise, the particular operation is performed (box 70) and control forwarded to decision box 72.

If there are further operations, i.e., another stock analysis, then control is returned to box 50, else, an end routine 74 is reached, the analysis process engine 20 forwards the results to the display or other device 24.

The combined data analysis methodology of the present invention is preferably practiced on a PC with a display device 24. Numerous conventional charts can be constructed accordingly, e.g., line plot, point and figure, candlestick and a host of other derivative methods. Daily, weekly, monthly and yearly charts show the progress of the stock over time, and conventional indicators can be used on the combined or merged data to better illustrate the results produced by the security analysis system of the present invention.

Figure 3:
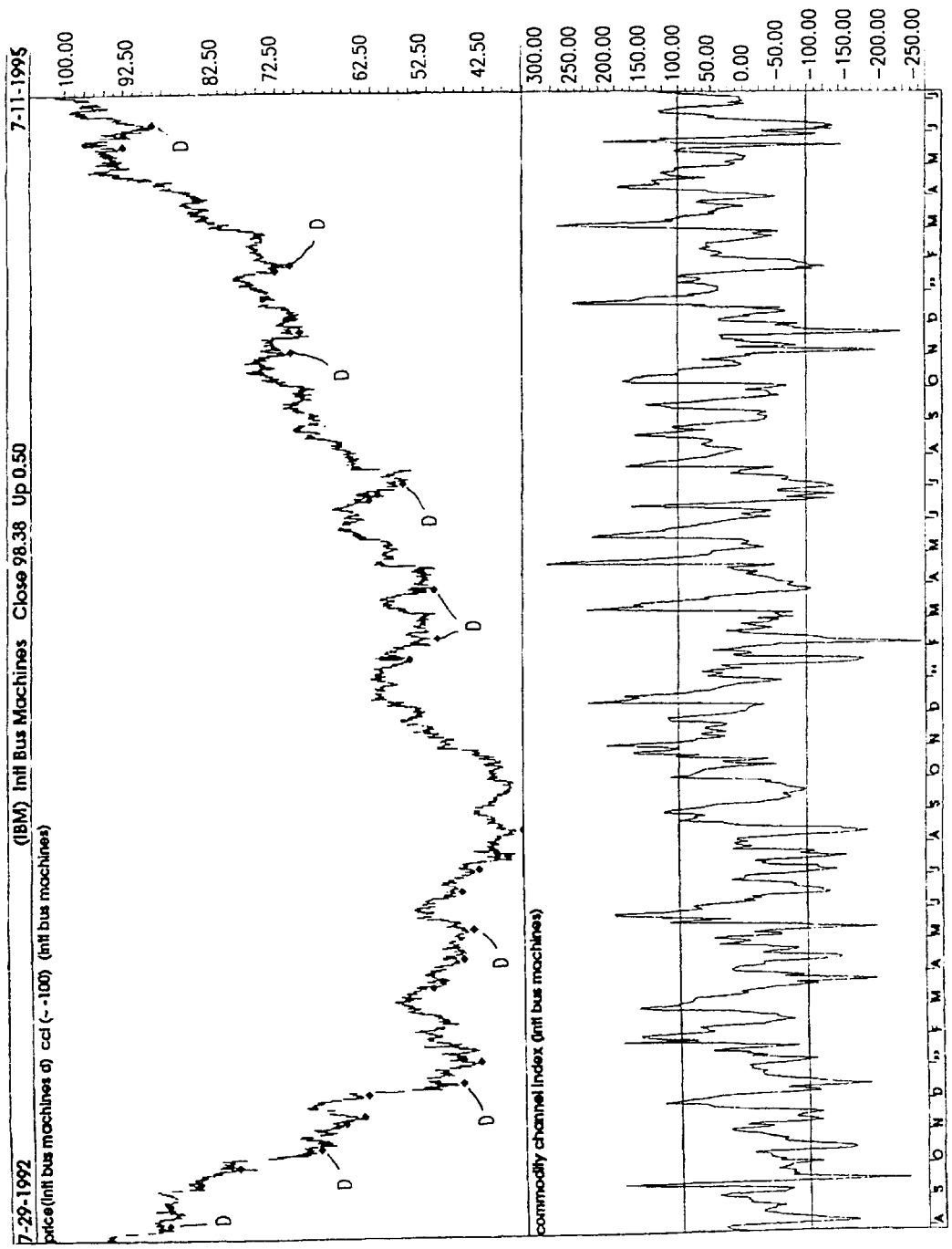
FIG. 3 illustrates a conventional stock price chart using technical indicators.

Shown in FIG. 3 is a conventional chart illustrating a stock price chart of IBM (the upper half) and a technical indicator called a Commodity Channel Index or CCI (the lower half). A security buy is suggested when the CCI falls below −100 and then rises above −100. As can be seen in FIG. 3, there are approximately two dozen instances falling within this criteria, also denoted by a corresponding number of diamond indicators (D) below the price bars in the price chart (the upper half). As is evident from an analysis of the indicated buying indicators (D) and subsequent stock activity, simple adherence to the CCI would produce poor results, particularly from mid-1992 through 1993.

Figure 4:
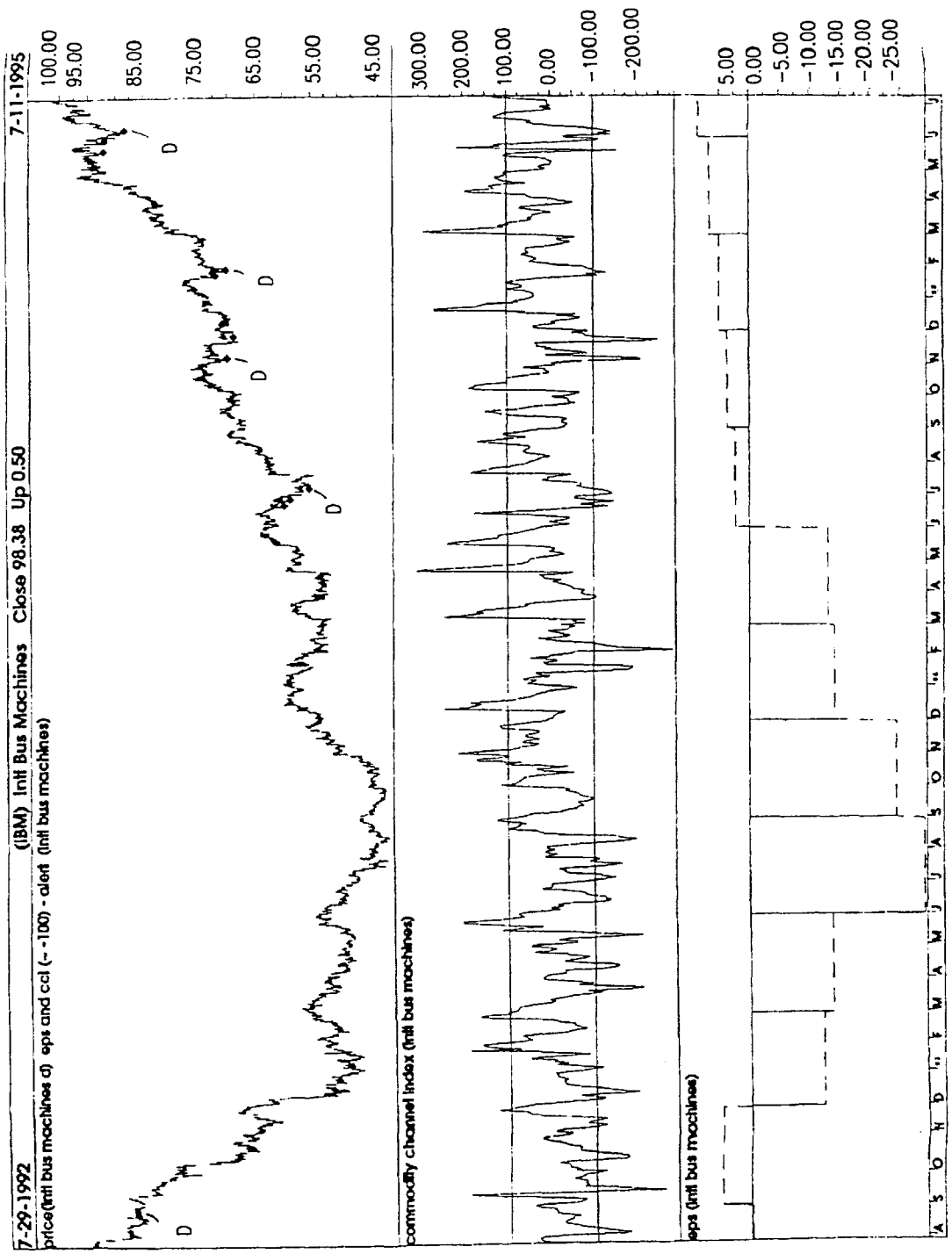
FIG. 4 illustrates a stock price chart prepared in accordance with the present invention including the technical indicators shown in FIG. 3 along with fundamental indicators.

Shown in FIG. 4 is the stock price chart for IBM (the upper part) and the technical indicator (the middle part), substantially as shown in FIG. 3. The lower part of the chart illustrates an aspect of the fundamental data, i.e.. Earnings per Share (EPS). A security buy based on both the technical fundamental data in accordance with the present invention, pursuant to the illustrated IBM data in FIG. 4, is indicated when the CCI falls below −100, then rises above −100 and the EPS for a given quarter has been rising for two successive years. As can be seen in FIG. 4, there are fewer instances meeting this criteria, also denoted by a corresponding number of diamond indicators (D) below the price bars in the price chart (the upper part). As is evident from an analysis of the indicated buys and subsequent stock activity, the convenient and simultaneous combination of technical and fundamental data made possible by the security analysis system of the present invention produces better results than those in FIG. 3, particularly for the mid-1992 through 1993 period.

Figure 5:
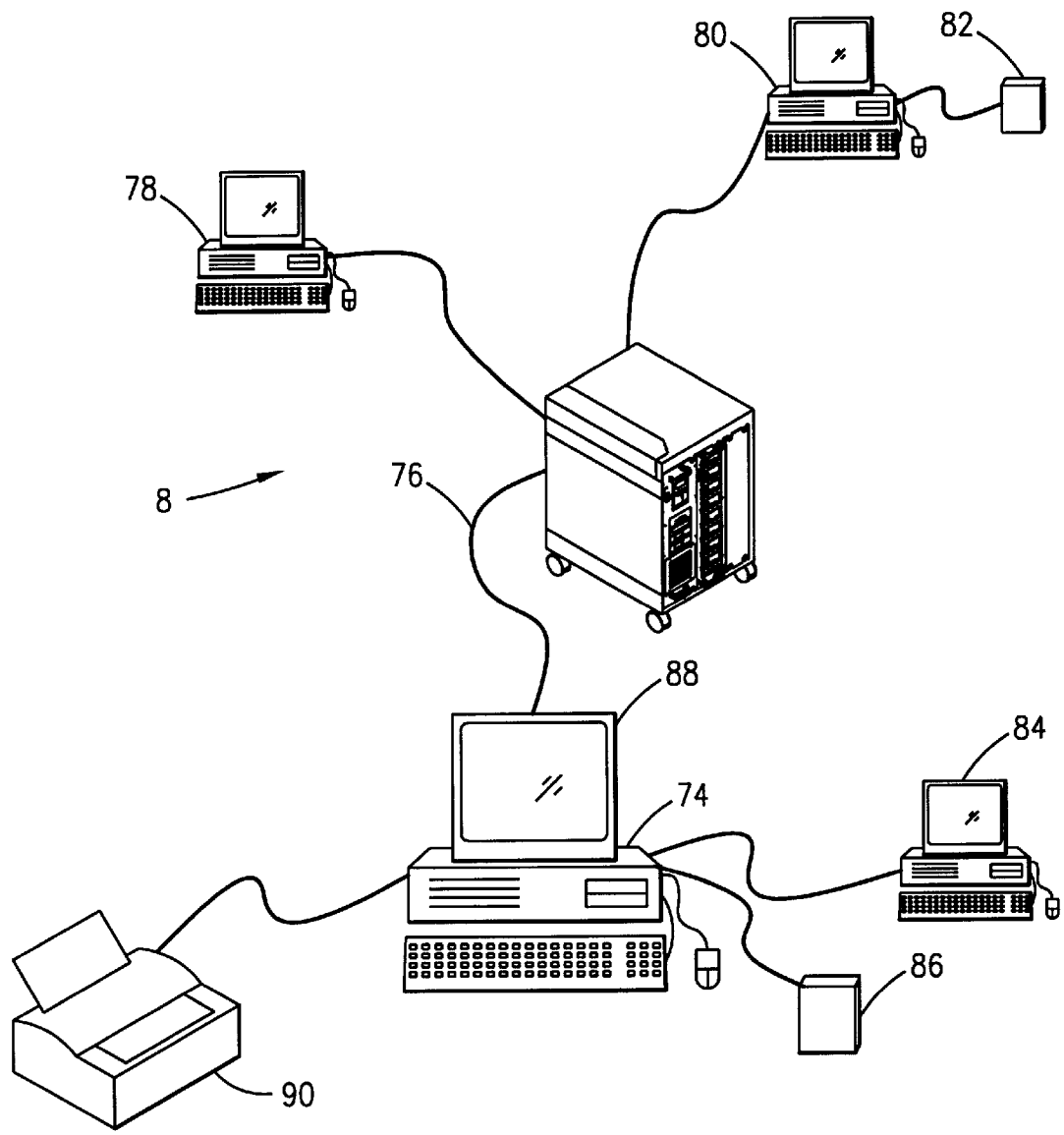
FIG. 5 illustrates a computer system incorporating the security analysis system according to the present invention.

It should be understood that the security analysis system 8 and the aforedescribed constituent components thereof may be part of a single computer 74, such as a PC, as shown in FIG. 5 and some of the components, such as the technical and fundamental data storage devices 12 and 16, respectively, and the rules storage device 28, may be accessed remotely, such as across a network. For example, voluminous technical and fundamental data on a particular stock can be accessed from one or several databases in one or several computers remotely, such as through a network connection 76 connecting computer 74 to a first remote computer 78 that contains all or part of the technical data needed for an analysis, a second remote computer 80 that contains all or part of the fundamental data needed for said analysis and a storage device 82 attached to said second remote computer 80 that contains the aforementioned analytical rules set within a database therein. Alternatively, or in conjunction with the above, a local network computer 84 may also contain the aforedescribed data and rules therein, all for access by the data conversion apparatus 10 and analytical process engine 20 within computer 74. Also, recent data for a stock can be accessed and downloaded into computer memory or into a storage device attached thereto, such as storage device 86 also shown in FIG. 5.

It should be understood that an analyst or user of a computer system incorporating the subject matter of the present invention is preferably able to choose from a variety of technical and fundamental analysis techniques and methodologies. Accordingly, the particular user, who may interpret the results of a technical or fundamental analysis differently, is preferably able to adapt the security analysis system of the present invention to their own tastes or risk preferences. The technical and fundamental data are therefore preferably variably weighed, and a user can customize their analysis.

It should also be understood that the device 24 may constitute a graphical display device, which can display the analysis data in a variety of formats, e.g., charts, graphs and tabular, such as a computer screen 88 of computer 74, as shown in FIG. 5. Device 24 may also constitute a printer for printing a report of the analysis or a storage device to store the results, such as printer 90 in FIG. 5.

It should further be understood that numerous other technical and fundamental data than those discussed in the instant description may be combined in accordance with the present invention and analyses made therefrom.

It should also be understood that the combined technical and fundamental analysis made possible by the security analysis system of the present invention may include additional indicators in the analysis, e.g., RSI, Stochastics, Commodity Channel Index and various other indicators used alone or in conjunction.

The previous description is of preferred embodiments for implementing the invention, and the scope of the invention should not necessarily be limited by this description. The scope of the present invention is instead defined by the following claims.

What is claimed is:

1. In a computer system, a method for combining a plurality of historical data for at least one security, said historical data including at least technical and fundamental data for each said security, said technical data for one said security being arranged in a multiplicity of records according to a first sequential format, and said fundamental data for said one security being arranged in a plurality of records according to a second sequential format, said method comprising the steps of:

generating a table of records for said one security, said table comprising a multiplicity of rows and columns, each row of said table comprising a multiplicity of records substantially arranged in accordance with said first sequential format, the number of said multiplicity of records in each row corresponding to the number of a sample of technical data records for said one security;

inserting, into the corresponding records of a first row of said table, respective corresponding technical data values within said sample of technical data records;

converting said fundamental data from said second sequential format to said first sequential format, the number of converted fundamental data records being equal to the number of records in said sample of said technical data records; and inserting, into the corresponding records of a second row of said table, respective corresponding fundamental data values within said converted fundamental data records.

2. The method according to claim 1, further comprising the step of:

deleting a plurality of technical data records from said multiplicity of technical data records.

3. The method according to claim 2, wherein said step of deleting occurs prior to said step of generating said table of records for said one security.

4. The method according to claim 2, wherein said step of deleting occurs after said step of generating said table of records for said one security, wherein a plurality of said columns within said table are deleted.

5. The method according to claim 1, wherein in said step of generating said table of records for said one security, the number of records in said sample is a portion of the number of records of said multiplicity of technical data records.

6. The method according to claim 5, wherein said portion represents a given period of time.

7. The method according to claim 6, wherein said given period of time is a plurality of hours.

8. The method according to claim 6, wherein said given period of time is a plurality of days.

9. The method according to claim 6, wherein said given period of time is a plurality of weeks.

10. The method according to claim 6, wherein said given period of time is a plurality of months.

11. The method according to claim 6, wherein said given period of time is a plurality of years.

12. The method according to claim 1, wherein said step of converting said fundamental data comprises:

determining a correspondence between respective fundamental data values within said plurality of records of said fundamental data and respective technical data values within said sample of technical data records;

generating a multiplicity of records corresponding to the number of technical data records within said sample; and inserting said fundamental data values within said plurality of fundamental data records into said multiplicity of records, said fundamental data values therein being separated from one another by a plurality of empty records.

13. The method according to claim 12, further comprising:

inserting a fundamental data value into each of said empty records, the value of said fundamental data for each of said empty records being determined by a previous inserted fundamental data value.

14. The method according to claim 13, wherein said previous inserted fundamental data value inserted into a given empty record is the nearest non-empty previous fundamental data value within said multiplicity of records.

15. The method according to claim 12, wherein said multiplicity of records is said second row of said table.

16. The method according to claim 1, further comprising the step of:

displaying the tabular data values for said technical and fundamental data of said at least one security.

17. The method according to claim 16, wherein said step of displaying comprises displaying a graphical representation of the tabular data values.

18. The method according to claim 17, wherein said graphical representation is selected from at least one of the group consisting of a chart, a graph and a table.

19. The method according to claim 1, further comprising the step of:

computing, from a plurality of values within at least one of said rows of tabular data, another row of tabular data values, said values being selected from the group consisting of fundamental data values, technical data values and combinations thereof.

20. The method according to claim 19, wherein the step of computing comprises, for each record within said another row, adding a multiplicity of tabular data values from a corresponding multiplicity of records from said at least one of said rows.

21. The method according to claim 19, further comprising the step of:

displaying the tabular data values in said another row.

22. In a computer system, a security analysis system for combining a plurality of historical data for at least one security, said historical data including at least technical and fundamental data for each said security, said technical data for one said security arranged in a multiplicity of records according to a first sequential format, and said fundamental data for said one security arranged in a plurality of records according to a second format, said security analysis system comprising:

- a technical data storage device for storing said technical data for said one security;
- a fundamental data storage device for storing said fundamental data for said one security; and
- processor means for accessing said technical data from said technical data storage device and said fundamental data from said fundamental data storage device, converting said fundamental data from said second sequential format to said first sequential format, and combining said technical and fundamental data.

23. The security analysis system according to claim 22, wherein said processor means converts said technical data and said fundamental data into a third sequential format.

24. The security analysis system according to claim 23, wherein a plurality of said technical data records are deleted from said multiplicity of technical data records prior to conversion to said third format.

25. The security analysis system according to claim 23, wherein a plurality of said technical data records are deleted from said multiplicity of technical data records after conversion to said third format.

26. The security analysis system according to claim 22, wherein said processor means accesses at least one of said technical and fundamental data storage devices remotely through a network.

27. The security analysis system according to claim 22, wherein said processor means comprises:

- a conversion device, attached to said technical and fundamental data storage devices, for receiving and converting said technical and fundamental data into a third format; and
- an analysis device, attached to said conversion device, for receiving said technical and fundamental data in said third format and processing said data pursuant to a multiplicity of analytical rules.

28. The security analysis system according to claim 27, further comprising:

- a rules storage device, attached to said analysis device, for storing said multiplicity of analytical rules.

29. The security analysis system according to claim 28, wherein said analytical rules within said analysis device are accessed remotely through a network.

30. The security analysis system according to claim 22, further comprising:

- display means for displaying the combination of technical and fundamental data.

31. The security analysis system according to claim 30, wherein the manner of display by said display means of said combination is selected from at least one of the group consisting of a chart, a graph and a table.

32. The security analysis system according to claim 22, wherein said processor means determines a correspondence between respective fundamental data values within said plurality of records of said fundamental data and respective technical data values within said multiplicity of records of said technical data, generates a multiplicity of new records corresponding to the number of said multiplicity of records of said technical data, and inserts said fundamental data values within said plurality of records of said fundamental data into said multiplicity of new records, said fundamental data values therein being separated from one another by a plurality of empty records.

33. The security analysis system according to claim 32, wherein said processor means inserts a fundamental data value into each of said empty records, the value of said fundamental data for each of said empty records being determined by a previous inserted fundamental data value.

34. The security analysis system according to claim 33, wherein said previous inserted fundamental data value inserted into a given empty record is the nearest non-empty previous fundamental data value within said multiplicity of records.

35. A program storage device readable by a machine and encoding a program of instructions for executing the method steps of a specified one of claims 1 through 21.

36. An article of manufacture comprising a computer usable medium having computer readable program code means embodied thereon for causing a combination of a plurality of historical data for at least one security, said historical data including at least technical and fundamental data for each said security, said technical data for one said security arranged in a multiplicity of records according to a first sequential format, said fundamental data for said one security arranged in a plurality of records according to a second sequential format, the computer readable program code means in said article of manufacture comprising:

- computer readable program code means for causing a computer to access said technical data from said technical data storage device and said fundamental data from said fundamental data storage device, said computer readable program code means comprising:
  - conversion means for converting said fundamental data into said first format; and
  - combination means for combining said technical and fundamental data.

37. The article of manufacture according to claim 36, further comprising:

- computer readable program code means for causing the computer to display the combination of technical and fundamental data on a display device.

38. The article of manufacture according to claim 36, further comprising:

- computer readable program code means for causing the computer to access a plurality of analytical rules within an analysis device and applying at least one of said rules to said technical and fundamental data.

* * * * *

UNITED STATES PATENT AND TRADEMARK OFFICE
CERTIFICATE OF CORRECTION

PATENT NO. : 6,012,042
DATED : January 4, 2000
INVENTOR(S) : T. Keith Black, et. al.

It is certified that error appears in the above-identified patent and that said Letters Patent is hereby corrected as shown below:

Title page, item [73] Assignee : should read --Window on Wallstreet, Inc. Richardson, Texas--

Title page, item [56] replace "Senkens" with --Jenkens--

Signed and Sealed this

Eighth Day of May, 2001

Attest:

NICHOLAS P. GODICI

Attesting Officer

Acting Director of the United States Patent and Trademark Office